United States Patent [19]
Gamell

[11] 3,948,235
[45] Apr. 6, 1976

[54] SYSTEM FOR UTILIZING WASTE HEAT OF AN INTERNAL COMBUSTION ENGINE

[75] Inventor: Joseph A. Gamell, Kalamazoo, Mich.

[73] Assignee: Joseph Gamell Industries, Incorporated, Kalamazoo, Mich.

[22] Filed: Mar. 31, 1975

[21] Appl. No.: 563,665

Related U.S. Application Data

[63] Continuation of Ser. No. 443,399, Feb. 19, 1974, abandoned, which is a continuation-in-part of Ser. No. 411,328, Oct. 31, 1973, abandoned, which is a continuation of Ser. No. 250,879, May 8, 1972, abandoned.

[52] U.S. Cl................ 123/119 C; 60/39.55; 60/604
[51] Int. Cl.².......................................... F01K 23/06
[58] Field of Search ....... 60/39.54, 39.55, 604, 605, 60/616, 618; 123/25 A, 119 C, 119 CF

[56] References Cited
UNITED STATES PATENTS

| | | | |
|---|---|---|---|
| 1,915,594 | 6/1933 | Cobb | 60/605 |
| 2,109,237 | 2/1938 | Lustig | 60/605 |
| 2,379,183 | 6/1945 | Price | 60/605 |
| 2,708,424 | 5/1955 | Jensen et al. | 123/25 A |
| 2,919,540 | 1/1960 | Percival | 60/39.55 |

FOREIGN PATENTS OR APPLICATIONS

| | | | |
|---|---|---|---|
| 596,855 | 5/1934 | Germany | 60/604 |
| 608,427 | 4/1926 | France | 60/604 |
| 545,295 | 5/1942 | United Kingdom | 60/604 |

*Primary Examiner*—Manuel A. Antonakas
*Attorney, Agent, or Firm*—Gordon W. Hueschen

[57] ABSTRACT

Waste heat generated by an internal combustion engine is utilized by an apparatus comprising a supercharger, a turbine drivably engaging the supercharger, a vaporizer, a condenser and fluid injection duct means. The turbine, the vaporizer and the condenser form a closed loop within which a motive fluid is circulated. The vaporizer is intimately associated with the internal combustion engine, and the motive fluid within the vaporizer is converted to gaseous form by heat transfer from the engine. The vaporized fluid is then used to drive the turbine which, in turn, drives the supercharger, thereby increasing the efficiency of the engine. Spent motive fluid is recovered from the turbine, condensed, and recycled to the vaporizer. Additionally, a fluid injection duct introduces fluid preferably in the form of steam into the air which enters the engine.

9 Claims, 8 Drawing Figures

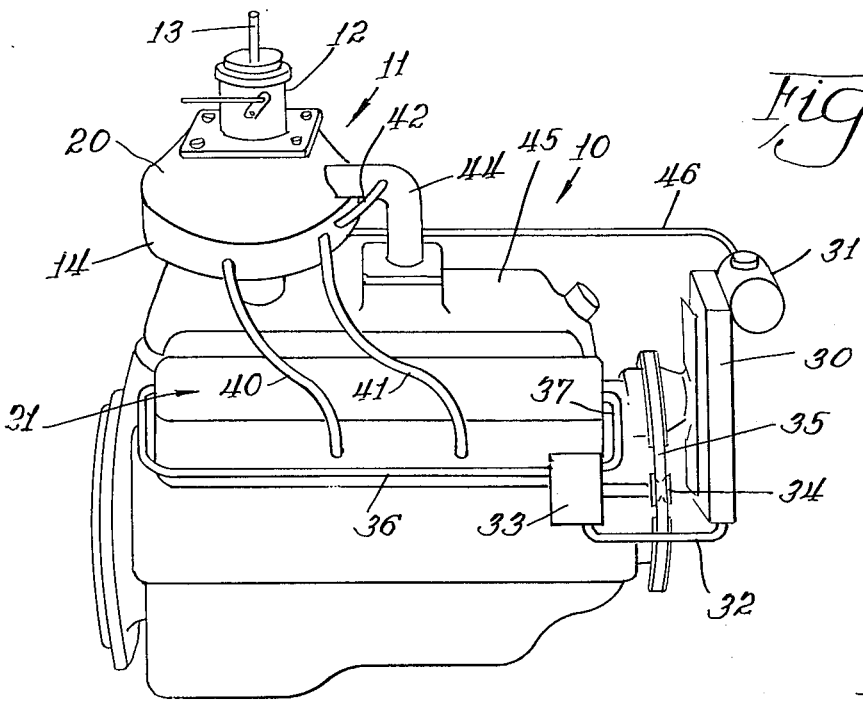
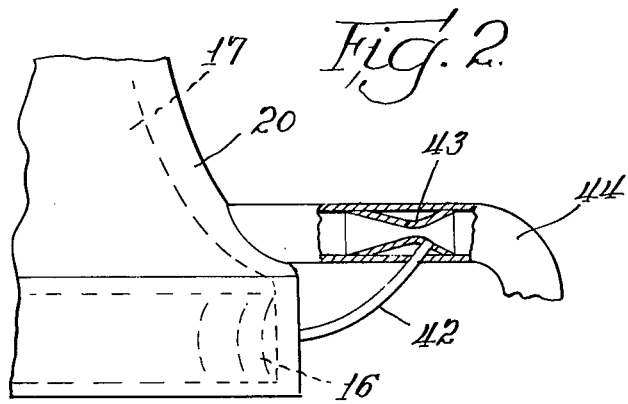
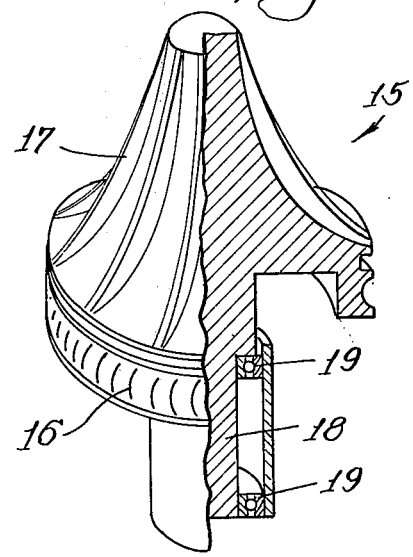
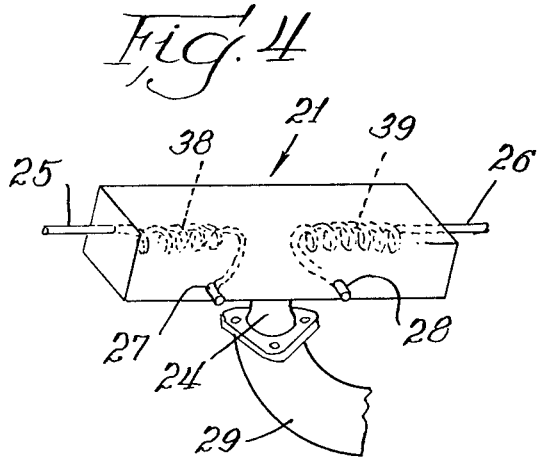
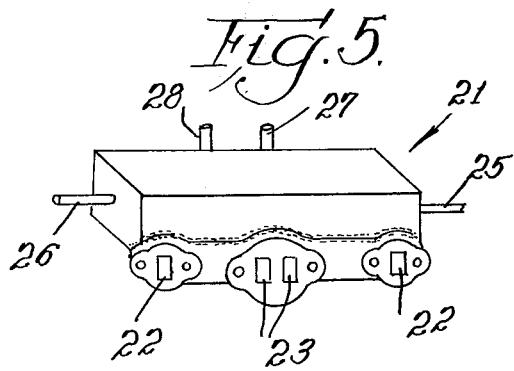

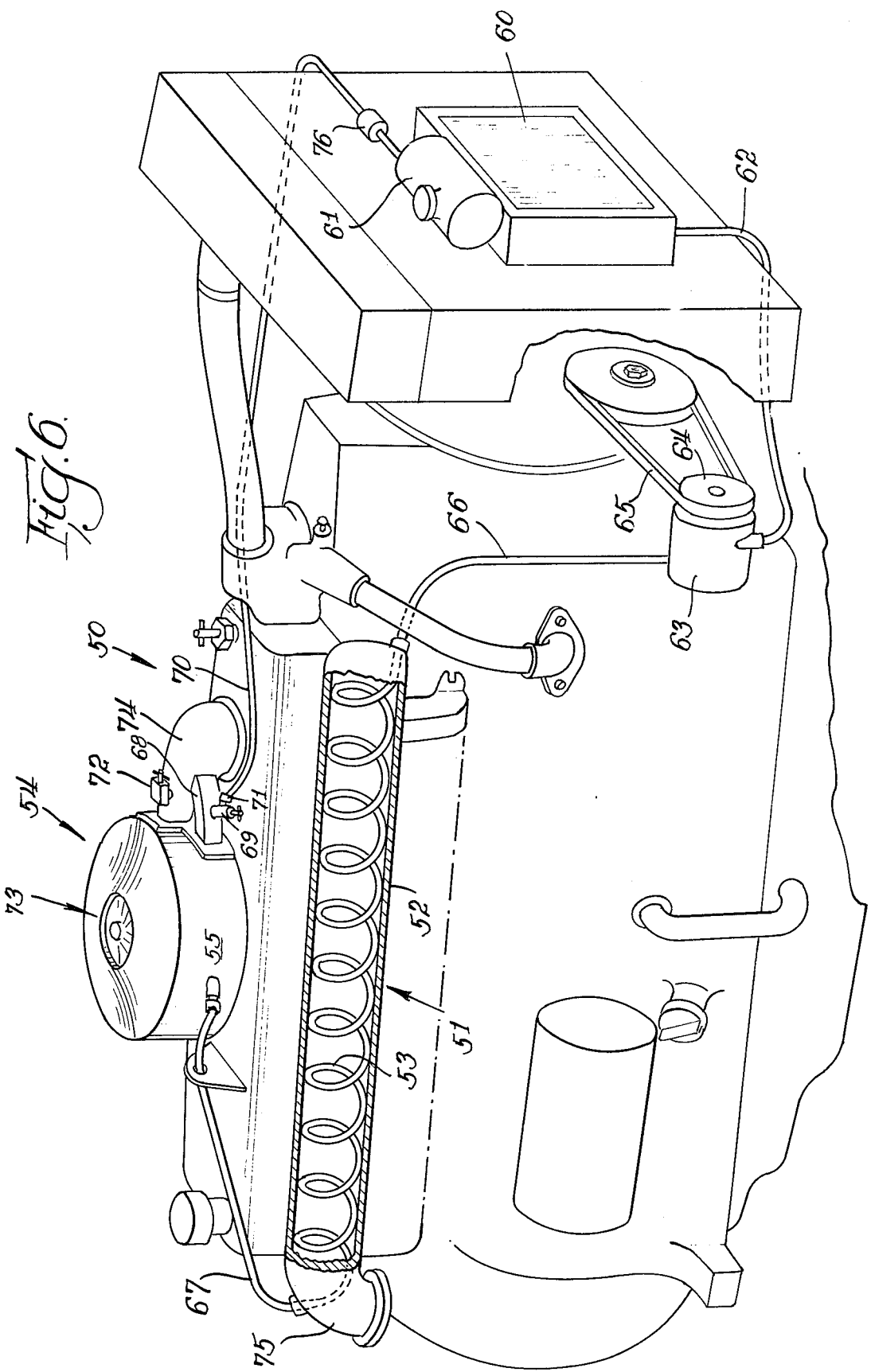

SYSTEM FOR UTILIZING WASTE HEAT OF AN INTERNAL COMBUSTION ENGINE

CROSS-REFERENCE TO RELATED APPLICATIONS

This application is a Continuation of application Ser. No. 443,399, now abandoned filed Feb. 19, 1974, which is in turn a Continuation-in-Part of application Ser. NO. 411,328, now abandoned filed Oct. 31, 1973, which is in turn a continuation of application Ser. No. 250,879, filed May 8, 1972, all now abandoned.

BACKGROUND OF THE INVENTION

This invention relates to internal combustion engines.

During the operation of an internal combustion engine a substantial amount of energy is given off as heat and is dissipated to the ambient atmosphere and lost. Supercharging of an internal combustion engine increases the power output of the engine and is desirable for aircraft engines for take-off power and to compensate for the relatively rare atmosphere encountered at higher altitudes, for automotive engines at high speeds, and for Diesel engines for increased output. However, power to drive the supercharger normally is provided by the internal combustion engine itself, thus a portion of the total engine power output, which otherwise would be available for other purposes, must be allocated to drive the supercharger. Usually superchargers are driven by gearing directly to the engine, or through a gear box and clutches so as to provide more than one speed ratio. It is also known to drive a supercharger by means of an exhaust gas turbine; however, such an arrangement increases the exhaust gas pressure and thus decreases engine efficiency.

The injection of a fluid in the form of water or steam into the intake manifold of internal combustion engines is known to provide many benefits. Such injection provides improved engine performance, and supplemental cooling. The injection of water has also been found to be useful in reducing the amount of pollution products discharged by internal combustion engines. For example, it has been found that nitric oxide is very rapidly formed during combustion. Subsequently, during the expansion process, the nitric oxide remains fixed in concentration, and is therefore finally exhausted in quantities corresponding to those of its high temperature formation. It has been found that the injection of water into an internal combustion engine greatly reduces the amount of nitric oxide formed. The injection of water into the fuel mixture results not only in the removal of nitrogen oxide, but also in the removal or at least reduction of odors and smoke. The odor and smoke problems are particularly encountered in Diesel engines.

SUMMARY OF THE INVENTION

It is an object of the present invention to provide means whereby waste heat of an internal combustion engine is utilized to drive engine accessory items such as a supercharger, or the like.

It is a further object of the present invention to provide means for driving a supercharger which is independent of engine revolution rate so that pressure generated by the supercharger can be regulated as required to reduce undesirable exhaust emissions at low engine revolution rate.

It is still another object of the present invention to provide a duct means so that a portion of the fluid in the supercharger system is introduced into the intake manifold in the form of water or steam in order to attain better operating efficiency of the engine.

It is still another object of the invention to provide means for utilizing the waste heat of an internal combustion to inject a fluid into the intake manifold of the engine in order to reduce the formation of pollution products such as nitric oxide.

Still other objects of this invention will present themselves to one skilled in the art upon reference to the ensuing specification, the drawings, and the claims.

The present invention contemplates an apparatus for utilization of waste heat from an internal combustion engine which comprises supercharger means having an impeller situated in an engine air intake conduit; turbine means driving said supercharger means and provided with a motive fluid inlet port and a motive fluid outlet port; vaporizer means intimately associated with the internal combustion engine, heated by the engine, and provided with a motive fluid outlet which communicates with the turbine motive fluid inlet port and further provided with a motive fluid inlet; condenser means provided with a motive fluid inlet which communicates via a confined flow passageway with the turbine exhaust port and further provided with a motive fluid outlet which communicates with the vaporizer inlet. A check valve means is situated in said confined flow passageway between the turbine exhaust port and the condenser inlet and permits only unidirectional flow of motive fluid from the turbine means to the condenser means. The turbine means, vaporizer means, and condenser means together define a closed loop in which a motive fluid circulates.

The invention further includes duct means for introducing a portion of the fluid from the system into the intake manifold of the engine to obtain the benefits of fluid injection.

The method of this invention contemplates providing a turbine means which drivably engages an accessory means for an internal combustion engine, vaporizing a motive fluid by means of heat transfer from a hot internal combustion engine, driving the turbine means with the vaporized motive fluid, recovering spent motive fluid from the turbine means, condensing the recovered motive fluid, recycling the condensed motive fluid for subsequent vaporization, and introducing a portion of the fluid into the intake manifold.

BRIEF DESCRIPTION OF THE DRAWINGS

In the drawings,

FIG. 1 is a perspective view of an internal combustion engine embodying the apparatus of the invention.

FIG. 2 is a fragmentary elevational view partly in cross section of the turbine and supercharger assembly.

FIG. 3 is a fragmentary perspective view partly in cross section of the turbine and supercharger impeller assembly.

FIG. 4 is a fragmentary perspective view partly in cross section of an exhaust manifold and steam generator assembly.

FIG. 5 is a fragmentary perspective view of the exhaust manifold-steam generator assembly taken in a position rotated 90° with respect to that shown in FIG. 4.

FIG. 6 is a perspective view of an engine according to another embodiment of the invention.

DESCRIPTION OF THE PREFERRED EMBODIMENTS

Figure 7:
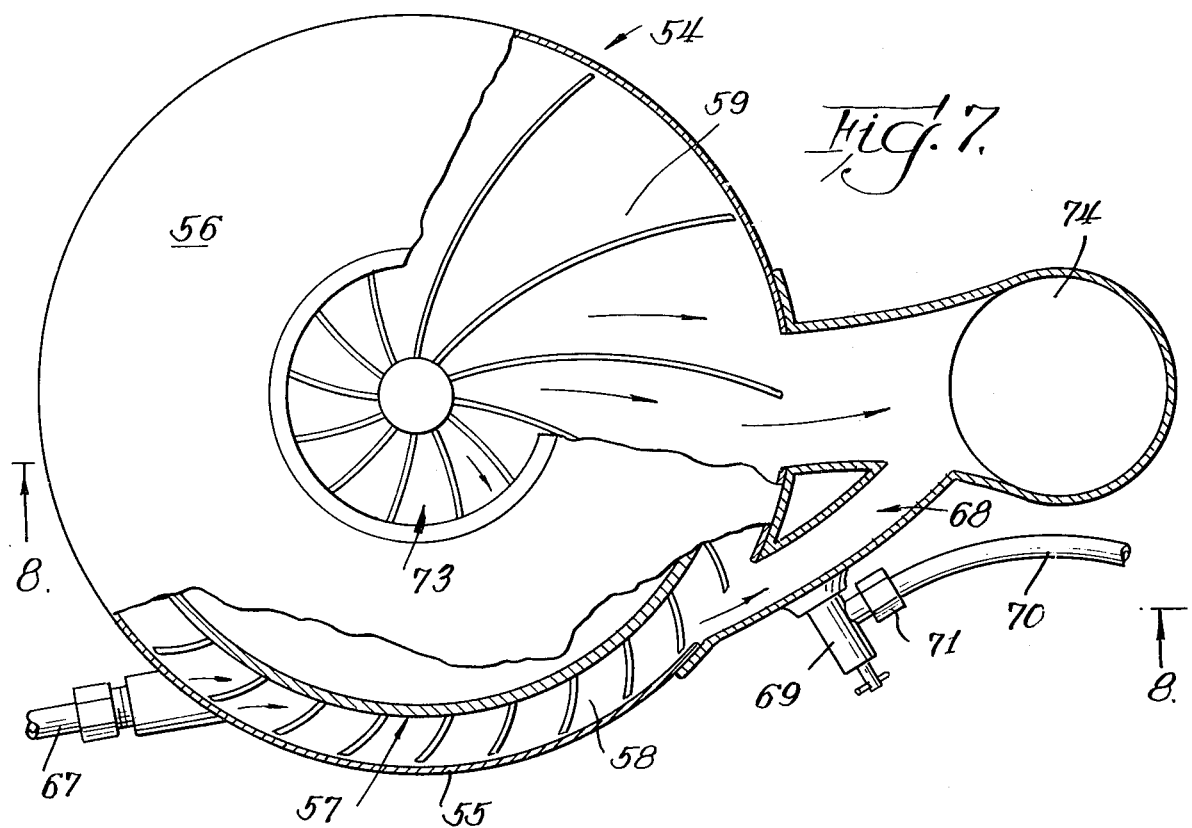
FIG. 7 is a fragmentary top view partly in cross section of the turbine-supercharger assembly according to the invention.

Referring to FIGS. 1–5, an engine 10 according to the invention is shown having a turbine-supercharger assembly 11 mounted thereon, with a carburetor 12 having an air cleaner mounting bolt 13 mounted over the turbine-supercharger assembly 11. Alternatively, the supercharger may be mounted over the carburetor and force air therethrough. The turbine-supercharger assembly 11 comprises a turbine housing 14 and a supercharger housing 20 having a rotor assembly 15 mounted therein comprising a turbine rotor member 16 and a supercharger member 17 rotatably mounted on a shaft 18 journaled in bearings 19 (FIG. 3).

Mounted on the Engine 10 is an exhaust manifold 21 illustrated in greater detail in FIGS. 4 and 5 having exhaust inlets 22 and 23 (FIG. 5), and exhaust outlet 24, water inlets 25 and 26, and steam outlets 27 and 28. The exhaust outlet 24 is connected to an exhaust pipe 29.

Referring to FIG. 1, a condenser 30 is mounted at the forward portion of the engine and has a water reservoir 31 mounted thereover. The condenser 30 is connected by means of a water duct 32 to a water pump 33 which is operated by means of a pulley 34 mounted on the water pump shaft, and which is in turn rotated by a belt 35. The pump 33 pumps water through water supply ducts 36 and 37 to tubular coils 38 and 39 of a material such as aluminum or copper disposed within the exhaust manifold generator assembly 21. Steam ducts 40 and 41 connected to the steam outlets 27 and 28, respectively, supply steam to the turbine housing 14 and drive the turbine rotor member 16. A portion of the steam leaving the turbine housing 14 enters a steam injection duct 42 at a venturi 43, and is mixed with air forced from the supercharger housing 20, the mixed air proceeding along a fuel mixture duct 44 and entering the input manifold 45. A steam return duct 46 returns steam from the turbine which was not injected into the injection tube 42.

In operation water from the condenser 30 flows through the duct 32 to the water pump 33. The pump pumps water through the ducts 36 and 37 into the coils 38 and 39 of the exhaust manifold steam generator 21. The hot exhaust gases passing through the manifold heat the water in the coils and generate steam which exits through the steam outlets 27 and 28 and is forced through the steam ducts 40 and 41 into the turbine housing 14. The steam under high pressure causes the turbine rotor member 16 to rotate at a high speed, also causing the supercharger rotor member 17 to rotate causing air to be sucked from the exterior through the carburetor and into the supercharger, and in turn forced under pressure into the fuel mixture duct 44. As the air passes through the venturi 43, it mixes with steam from the duct 42 and the mixture comprising air under pressure, fuel, and steam pass through the fuel mixture duct to the input manifold 45 from which it is introduced into the cylinders. The spent steam from the turbine which does not enter the injection tube 42 passes into the duct 46 and back into the condenser where it is condensed to liquid. Water from the reservoir 31 is either periodically or continuously introduced into the condenser to replace the water utilized for fluid injection.

Figure 8:
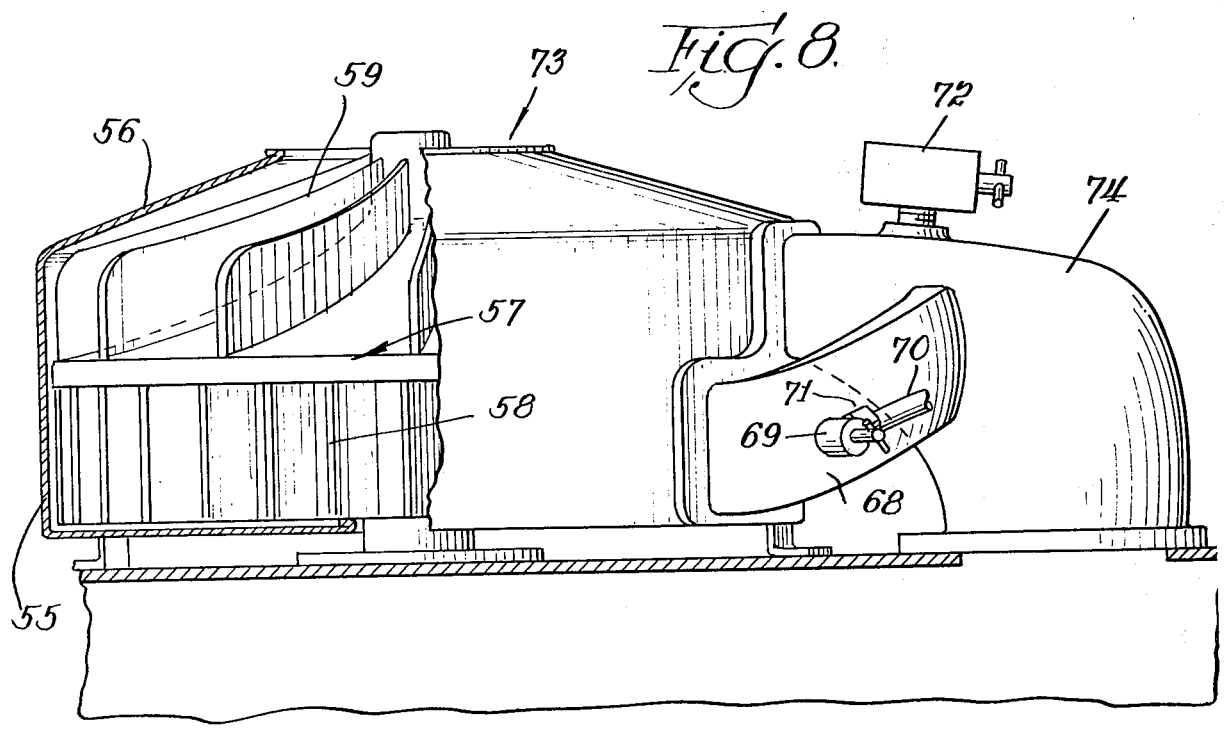
FIG. 8 is a fragmentary side elevational view partly broken away of the turbine-supercharger structure shown in FIG. 7.

Referring to FIGS. 6–8, an alternative embodiment is shown utilizing a diesel engine. As illustrated, the engine 50 comprises a steam generator 51 comprised of an exhaust manifold 52 having a coiled tube 53 mounted therein. A turbine-supercharger assembly 54 is mounted on the engine and comprises a turbine housing 55, a supercharger housing 56, and an impeller assembly 57 including a turbine rotor member 58 and a supercharger rotor member 59 affixed together and rotatably mounted in the housings of the assembly (FIGS. 7 and 8).

As illustrated in FIG. 6, a water condenser 60 is mounted at a forward portion of the engine and has a water reservoir 61 mounted thereon. A duct 62 transports water to a water pump 63 powered by a pulley 64 mounted on the shaft thereon and a belt 65 drawing power from the engine. A water duct 66 transports water to the coil 53. Hot gases from the engine pass through the exhaust tube 52 and heat the coils 53 causing the water to be transformed into steam. The exhaust gases pass out of the exhaust duct 75 and into the exhaust system of the vehicle. The steam passes through a steam duct 67 to the turbine housing 55 where it causes the turbine rotor member 58 to rotate, thereby also rotating the supercharger member 59. Air is drawn by the impeller of the rotor through the air intake 73 and into the manifold intake 74. There steam is introduced through the steam injection duct 68 where the steam mixes with the air compressed by the supercharger and enters the manifold intake 74. A bypass valve 69 permits the steam not required for mixture with the air intake to pass into the steam return duct 70 through a check valve 71. A bleed-off air valve 72 removes surplus air. The spent steam returns through the duct 70 back to the condenser 60 where it is condensed to liquid water. The water reservoir 61 adds water to the condenser when needed to replace the water utilized in the combustion system. A check value 76 may be utilized to prevent backup of the fluid from the condenser.

If desired, a water control system for controlling the amount of water reaching the boiler system may be provided by a reservoir in the form of a can having another can mounted therein, the entire reservoir mounted on the exhaust manifold. When the water in the inner can reaches a predetermined level, an electrode becomes immersed in the water, thereby triggering a solenoid on the water inlet duct from the water pump. Such an apparatus may be adjusted to provide the desired amount of water to be supplied to the boiler apparatus on the manifold.

The combination supercharger and fluid injection apparatus of the present invention has many advantages over prior art structures. First, the system utilizes heat from the exhaust system which is normally wasted and converts the heat to the useful purposes of driving the system. The system provides supercharged air into the fuel mixture, thereby increasing the efficiency and power rating of the engine without increasing fuel demand. The compressed air applied causes better engine efficiency and greater fuel economy, important considerations during an era of fuel shortages. The addition of fluid injection into the fuel mixture further increases the efficiency and fuel economy of the engine, and additionally results in a marked decrease of the pollution products normally discharged by the exhaust system, and is particularly useful in reducing the amount of nitric oxide which is discharged by the engine with the exhaust gases. Further, the enumerated advantages are obtained at no additional cost for fuel to drive the system, and the system is relatively inexpensive to fabricate and install.

It is to be understood that the invention is not to be limited to the exact details of operation or structure shown and described, as obvious modifications and equivalents will be apparent to one skilled in the art.

I claim:

1. Apparatus for utilizing waste heat from an internal combustion engine for operating a supercharger and additionally injecting a fluid into the intake air mixture of the engine which comprises:

supercharger means having an impeller situated in an air intake conduit of an internal combustion engine, turbine means driving said supercharger means and provided with a motive fluid inlet port and a motive fluid outlet port, vaporizer means intimately associated with said engine adapted to be heated by the exhaust gases of said engine and provided with motive fluid outlet communicating with said motive fluid inlet port of said turbine means and provided with a motive fluid inlet, condenser means provided with a motive fluid inlet communicating via a confined flow passageway with said turbine outlet port and provided with a motive fluid outlet communicating with said vaporizer inlet, said apparatus being completely separated from the fuel system of said engine and having a non-combustible fluid therein, and duct means adapted to transport a portion of the fluid expanded in said turbine into the input manifold of said engine.

2. An apparatus according to claim 1, wherein said internal combustion engine is provided with a carburetor.

3. An apparatus according to claim 1, wherein said internal combustion engine is a Diesel engine.

4. An apparatus according to claim 1, wherein said internal combustion engine is provided with a venturi tube connecting said supercharger means to said input manifold, and said duct means is connected from said turbine means to the constriction of said venturi tube.

5. An apparatus according to claim 1, wherein a check valve is provided in the return duct to said condenser inlet permitting only unidirectional flow of motive fluid from said turbine means to said condenser means.

6. An apparatus according to claim 1, wherein said motive fluid is water.

7. An apparatus according to claim 1, wherein said condenser means is provided with a liquid reservoir adapted to replenish the fluid injected into said engine.

8. An apparatus according to claim 1, wherein said duct means has one end connected to the outlet of said turbine means and the other end connected to the input manifold of said engine.

9. An apparatus according to claim 1, wherein the fluid system of said apparatus is completely separate from the cooling system of said internal combustion engine.

* * * * *